G. A. BURNHAM.
ELECTRICAL DISTRIBUTION SYSTEM.
APPLICATION FILED MAY 17, 1917.
1,324,226. Patented Dec. 9, 1919.
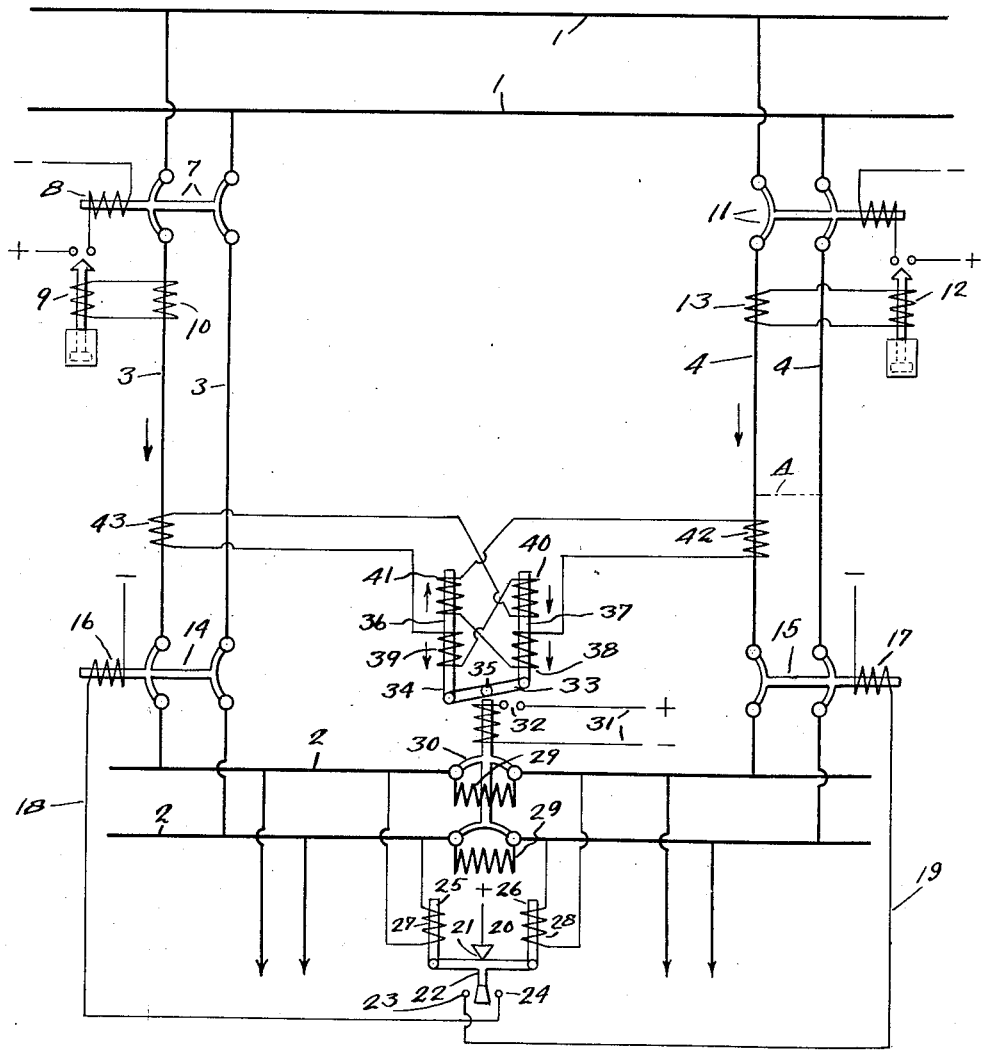
Inventor,
George A. Burnham
by
B. J. Noyes

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

ELECTRICAL DISTRIBUTION SYSTEM.

1,324,226.  Specification of Letters Patent.  Patented Dec. 9, 1919.

Application filed May 17, 1917. Serial No. 169,226.

*To all whom it may concern:*

Be it known that I, GEORGE A. BURNHAM, a citizen of the United States, residing at Saugus, in the county of Essex and State of Massachusetts, have invented an Improvement in Electrical Distribution Systems, of which the following is a specification.

My invention relates to the protection of electric distribution circuits and has particular reference to circuits employing parallel feeders between two points of the distribution system.

The object of my invention is to protect the parallel feeder circuits from the effects of a fault in any parallel feeder circuit, and to isolate the feeder circuit in which the fault occurs from the distribution system without the use of the usual reverse current relay with potential coil or the necessity of split-conductor cables, and which permits the feeders to have entirely different electrical constants without in any way affecting the proper operation of the protective equipment and which permits the use of standard current transformers having widely different characteristics.

The figure shows the diagram of circuit connections of the protection apparatus with the distribution system.

As here shown, the distribution system comprises the generator bus 1—1, the sub-station bus 2—2, the parallel feeder circuits 3—3 and 4—4 which connect the generator bus with the sub-station bus and with distribution circuits.

The feeder circuit 3—3 has interposed at its generator bus end the switch 7, operated by the coil 8 which is under the control of the time limit relay 9, which is energized by current from a standard current transformer 10.

Feeder circuit 4—4 has a similar switch 11, the operation of which is controlled by a time limit relay 12 energized by current from the transformer 13 in the feeder circuit.

At the sub-station end, the feeder circuits are controlled by switches 14 and 15, operated by coils 16 and 17 in the circuits 18 and 19, which are controlled by the balanced relay 20.

The balanced relay 20 comprises an arm, pivoted at 21, and is provided with an extension or contact 22 which is normally maintained midway between two stationary contacts 23 and 24, to which are connected the circuits 18 and 19. Two cores 25 and 26 are pivoted to the ends of the relay arm and are adapted to be actuated by solenoids 27 and 28 upon unequal energization thereof to move the contact 22 carried by the relay arm into contact with the stationary contact 23 or 24 to close the circuit to open switch 14 or 15.

Solenoids 27 and 28 are connected to the sub-station bus on opposite sides of an impedance 29 which is inserted therein and adapted to be normally short-circuited by a switch 30. Since the reactance 29 is normally short-circuited, there is no difference of potential between the balanced relay coils 27 and 28 and consequently both coils are equally energized and the relay arm and contact maintained in neutral position. When the switch 30 is opened upon the occurrence of a fault, such as a short circuit, in one of the feeder circuits there will be a flow of current through the impedance that will cause a sufficient difference of potential to exist across its terminals to unequally energize the relay coils and operate the relay.

Switch 30 is controlled by a coil in a circuit 31, normally open at the contacts 32, but adapted to be closed by the bridging contact 33 to close the circuit to open the switch 30.

Contact 33 is supported by the arm of a relay 34 and is pivoted at 35 intermediate its length. Two solenoid cores 36 and 37 are pivoted to the ends of the relay arm and are adapted to be actuated by coils 38 and 39, 40, and 41, respectively. Coils 38 and 41 are connected in series with the secondary of a current transformer 42 in the sub-station end of the feeder circuit 4—4 and coils 39 and 40 are connected to a similar transformer 43 in the feeder circuit 3—3. The direction of the current flow in the relay coils is such that, in the normal operation of the system, the bridging contact 33 is maintained in raised position away from stationary contact 32, and the relay will not be operated to close the contacts upon a relative unbalancing of the current strengths in the several relay coils, irrespective of the amount of the unbalancing but will only operate upon a relative reversal of current in either one of the two feeder circuits 3—3 and 4—4.

In the normal operation of the system, the relay 34 is in its inoperative position, and maintains the control circuit 31 for the switch 30 in open condition, and balanced relay 20 is maintained in its neutral position by the equal energization of its coils. Upon the occurrence of a fault between the leads of a feeder circuit, such as a short circuit between the wires of the feeder circuit 4—4, as at A, the normal condition of the distribution circuit is altered. Current, which, previous to the occurrence of the fault flowed from the generator bus through the current transformer 42 to the sub-station bus, ceases and is succeeded by a current flow from the sub-station bus through the current transformer 42 in the reverse direction. This upsets the balance maintained in the relay 34 and results in a preponderance of energization in one direction which serves to actuate the relay arm to close the control circuit 31 at the contacts 32 and energize the coil in circuit therewith to open the switch 30 thereby cutting in the reactance 29 in series with the sub-station bus 2—2. The current flowing through this reactance to the fault at A causes a difference of potential to be set up at its terminals, with the side of the bus 2—2 at the higher potential, and this difference of potential results in the stronger energization of the coil 27 over that of 28 and the consequent unbalancing of the relay arm which is moved to bring the contact 22 carried thereon against the stationary contact 24 which closes the circuit 19 to open the switch 15 at the sub-station bus.

Time limit relay 12 has also been energized by the increased current flow in feeder circuit 4—4 by the short at A, and, after a certain time interval, depending upon the calibration of the instrument, operates to open the switch 11 which connects the feeder circuit with the generator bus. Switch 11 does not open, however, until after the opening of switch 15 at the sub-station bus because of the instantaneous action of the relays controlling the latter.

After the defective feeder circuit 4—4 is thus isolated from the feeder circuit the switch 30 controlling the reactance 29 in the sub-station bus may be reclosed by hand or by other means and the distribution circuits 6 be supplied from the feeder circuit 3—3.

During the operation of isolating the feeder circuit 4—4 the distribution circuit 6 is operating at a slight drop in voltage, equal to that across the impedance 29, but this is so small that no harmful results follow.

A fault or short circuit in feeder circuit 3—3 would cause the operation of the relays and switch as before to isolate that circuit from the distribution system.

I claim:—

1. In an electric distribution system, a generator bus, a sub-station bus, a plurality of parallel feeders connecting said buses, means operated by a reversal of current flow in one of said feeders to cause a difference of potential to exist between two points of the sub-station bus, and means operated by said potential difference to isolate said feeder from the sub-station bus.

2. In an electric distribution system, a generator bus, a sub-station bus, a plurality of parallel feeders connecting said buses, means operated by a reversal of current flow in one of said feeders to cause a difference of potential to exist between two points of the sub-station bus, and means operated by said potential difference to isolate said feeder from the sub-station bus, and separate means operated by the current flow in said feeders to isolate said feeder from the generator bus.

3. In an electric distribution system, a generator bus, a sub-station bus, a plurality of parallel feeders connecting said buses, means operated by a reversal of current flow in one of said feeders to cause a difference of potential to exist between two points of the sub-station bus, and means operated by said potential difference to isolate said feeder from the sub-station bus, and separate means operated by the current flow in said feeders to isolate said feeder from the generator bus, after the aforesaid means has operated to isolate said feeder from the sub-station bus.

4. In an electric distribution system, a generator bus, a sub-station bus, a plurality of parallel feeders connecting said buses, means governed by an abnormal current condition in one of said feeders to cause an abnormal current condition in the sub-station bus and means governed by said last abnormal current condition to isolate the faulty feeder from the sub-station bus.

5. In an electrical distribution system, a generator bus, a sub-station bus, a plurality of parallel feeders connecting said buses, a normally short-circuited reactance in said sub-station bus, means to remove the short-circuit from said reactance to set up a potential drop thereacross, and means dependent upon said potential drop for isolating a feeder from the system.

6. In an electric distribution system, a generator bus, a sub-station bus, a plurality of parallel feeders connecting said buses, means governed by an abnormal current condition in one of said feeders to cause an abnormal current condition in the sub-station bus, means governed by said last abnormal current condition to isolate the faulty feeder from the sub-station bus and separate means governed by the abnormal current condition in said faulty feeder to isolate said feeder from the generator bus.

7. In an electric distribution system, a generator bus, a sub-station bus, a plurality of parallel feeders connecting said buses, means operated by a relative reversal of current flow in said feeders to create a potential difference between two points of the sub-station bus, and means operated by said potential difference to isolate one of said feeders from the sub-station bus.

8. In an electric distribution system, a generator bus, a sub-station bus, a plurality of parallel feeders connecting said buses, means operated by an abnormal current flow in one of said feeders to cause a difference of potential to exist between two points of the sub-station bus, and means operated by said potential difference to isolate the faulty feeder from the sub-station bus.

9. In an electric distribution system, a generator bus, a sub-station bus, a plurality of parallel feeders connecting said buses, means arranged to cause an abnormal current condition in one of said feeders to set up an abnormal current condition in said sub-station bus, and means governed by the abnormal current condition in the sub-station bus to isolate the faulty feeder from the sub-station bus.

10. In an electric distribution system, a generator bus, a sub-station bus, a plurality of parallel feeders connecting said buses, means operated by a fault in one of said feeders to create a potential difference between two points of the sub-station bus, and means operated by said potential difference to isolate one of said feeders from the sub-station bus.

11. In an electrical distribution system, a generator bus, a substation bus, two parallel feeders connecting said buses, a reactance in the substation bus between said feeders, said reactance operable to set up a potential drop thereacross in one direction upon the occurrence of an abnormal current condition in one feeder, and in the other direction upon the occurrence of an abnormal current condition in the other feeder, and means selectively governed by the direction of said potential drop to isolate the faulty feeder from the substation bus.

12. In an electric distribution system, a generator bus, a substation bus, a plurality of parallel feeders connecting said buses, a reactance in said substation bus between two of said feeders, a normally balanced relay having its opposing coils connected to said bus on opposite sides of said reactance, means governed by a relative reversal of current flow in one of said feeders to cause a potential drop to be set up by said reactance in said bus in a direction toward the faulty feeder, and said relay selectively operated by said potential drop to isolate the faulty feeder from the substation bus.

In testimony whereof I have signed my name to this specification in the presence of two subscribing witnesses.

GEORGE A. BURNHAM.

Witnesses:
T. T. GREENWOOD,
H. B. DAVIS.